United States Patent
Wang

(10) Patent No.: US 11,788,682 B2
(45) Date of Patent: Oct. 17, 2023

(54) QUICK-INJECTION GREASE FILLING DEVICE

(71) Applicant: YO LEE AUTO CO., LTD., Tainan (TW)

(72) Inventor: Kun-Wang Wang, Tainan (TW)

(73) Assignee: YO LEE AUTO CO., LTD., Tainan (TW)

( * ) Notice: Subject to any disclaimer, the term of this patent is extended or adjusted under 35 U.S.C. 154(b) by 93 days.

(21) Appl. No.: 17/409,125

(22) Filed: Aug. 23, 2021

(65) Prior Publication Data
US 2023/0056004 A1     Feb. 23, 2023

(51) Int. Cl.
*F16N 11/02*     (2006.01)
*F16N 37/00*     (2006.01)
*F16C 33/66*     (2006.01)

(52) U.S. Cl.
CPC ........ *F16N 37/003* (2013.01); *F16C 33/6622* (2013.01); *F16N 11/02* (2013.01)

(58) Field of Classification Search
CPC ..... F16N 37/003; F16N 11/02; F16C 33/6622
USPC ........................................................ 184/5.1
See application file for complete search history.

(56) References Cited

U.S. PATENT DOCUMENTS

| | | | |
|---|---|---|---|
| 1,991,542 A * | 2/1935 | Cavanaugh | F16C 33/6622 141/367 |
| 2,210,478 A * | 8/1940 | Berg | F16C 33/6622 141/383 |
| 2,515,208 A | 7/1950 | Fox et al. | |
| 2,599,456 A * | 6/1952 | Ivie | F16C 33/6622 222/386 |
| 4,168,766 A * | 9/1979 | Shultz | F16C 19/364 141/357 |
| 4,405,035 A * | 9/1983 | Shultz | F16N 3/10 141/357 |
| 5,036,950 A | 8/1991 | Clark | |
| 5,709,284 A * | 1/1998 | Shultz, Sr. | F16N 11/02 222/386 |
| 6,247,554 B1 * | 6/2001 | Pool | F16C 33/6622 184/5.1 |
| 6,520,292 B1 * | 2/2003 | Kurtz | F16N 3/10 184/28 |
| 2022/0026019 A1 * | 1/2022 | Tseng | F16N 19/00 |

* cited by examiner

*Primary Examiner* — Gene O Crawford
*Assistant Examiner* — Emily R Kincaid

(57) ABSTRACT

A quick-injection grease filling device includes an oil cup, a detachable guide seat, a screw, a piston, an oppression part and a rotating drive part. The piston is held inside the oil tank, capable of moving upward and downward. The piston has an oppression surface and a bearing placement surface. The detachable guide seat includes a screw hole and a combination part which is attached to the cup mouth through a detachable assembly unit. The screw is screwed into the screw hole of the detachable guide seat to move forward and backward. The inner end of the screw extends into the oil cup, and the outward extending end extends out of the cup mouth. The rotation driving part is arranged on the outward extending end. The oppression part can move forward and backward along with the screw. The oppression part is used to press against the bearing.

7 Claims, 6 Drawing Sheets

QUICK-INJECTION GREASE FILLING DEVICE

CROSS-REFERENCE TO RELATED U.S. APPLICATIONS

Not applicable.

BACKGROUND OF THE INVENTION

1. Field of the Invention

The present invention relates generally to a grease filling device, and more particularly to an innovative structural design of a quick-injection grease filling device.

2. Description of Related Art Including Information Disclosed Under 37 CFR 1.97 and 37 CFR 1.98

The grease filling device referring to by the present invention is also called "grease filling can" in the industry. As the roller unit of the bearing structure is frequently subject to rolling friction and pressure during usage, it is an important procedure to lubricate it properly. At present, the bearing roller unit is usually lubricated using industrial grease as the lubricant. Such industrial grease is like paste under normal temperatures. Manually smearing it into the bearing roller unit is time consuming and costs a lot of labor, and the quality of filling is hard to control. In view of this, some manufacturers have developed a grease filling device in the form of a can to lubricate the bearings.

In actual applications, the existing grease filling devices still have some problems and shortcomings. For example, as most of the existing grease filling devices fill the grease by driving a pressing block to move forward and backward along a screw, so as to press the bearing and the piston component. After grease-filling is completed and the bearing is lubricated, if the operator needs to fill grease into another bearing, the pressing block must be driven to move backward to withdraw from the screw, and the bearing is released to be taken out. As we can see, the operator must take time to turn the pressing block for several rounds to proceed to the next grease filling process. This will seriously affect the work efficiency and labor cost in the grease filling operation. Therefore, it is an important topic that should be paid attention to by the related manufacturers, and a solution is to be developed.

BRIEF SUMMARY OF THE INVENTION

The main object of the present invention is to provide a quick-injection grease filling device. It aims to make a breakthrough in solving the technical problems by developing an ideal, practical, and innovative grease filling device. The quick-injection grease filling device is specially designed to assist the user to fill grease into the roller unit structure of the bearing. The bearing also includes inner frame part and outer frame part.

In view of the aforementioned object, the problem-solving technical feature of the present invention is that the quick-injection grease filling device mainly includes: an oil cup, a detachable guide seat, a screw, a piston, an oppression part and a rotating drive part. The oil cup has a closed cup bottom, and an open cup mouth, and a straight inner peripheral wall between the cup bottom and the cup mouth, the inside of the oil cup defines and forms an oil tank, the oil tank is used to hold the grease.

The piston is held inside the oil tank in a state that it can be driven to move upward and downward. The piston has an oppression surface and a bearing placement surface facing opposite directions, and a side ring surface connected to the periphery of the oppression surface and the bearing placement surface. The bearing placement surface faces upward toward the cup mouth. The oppression surface faces downward toward the cup bottom. The oppression surface is used to press down the grease held in the oil tank. The bearing placement surface is used for the bearing to be placed on it, so that the outer frame part of the bearing can press the bearing placement surface downward to define and form an enclosed and sealed grease filling margin. The side ring surface is configured with at least one sealing ring, and the at least one sealing ring is fitted on the straight inner peripheral wall and is capable of sliding. The center of the piston is formed with a plurality of through-holes that go through the oppression surface and the bearing placement surface.

The detachable guide seat includes a combination part and a screw hole, wherein the combination part is attached to the cup mouth of the oil cup through a detachable assembly unit, so that the detachable guide seat can be attached to or detached from the cup mouth.

The screw is screwed into the screw hole of the detachable guide seat to move forward and backward. The screw includes an inner end and an outward extending end, wherein the inner end extends into the oil cup, the outward extending end extends out of the cup mouth for a preset length, and the rotating drive part is configured on the outward extending end.

The oppression part is configured on the inner end of the screw, so that the oppression part can move forward and backward along with the screw, and the oppression part is used to press upon the bearing.

The main efficacy and advantage of the present invention is that, when the user wants to proceed to grease filling operation for the next bearing, once the detachable guide seat is re-installed on the cup mouth, the grease filling can be started as long as the operator starts to turn the screw. Thus, the grease filling operation becomes more efficient. Therefore, the present invention offers practical benefits.

DETAILED DESCRIPTION OF THE INVENTION

Figure 1:
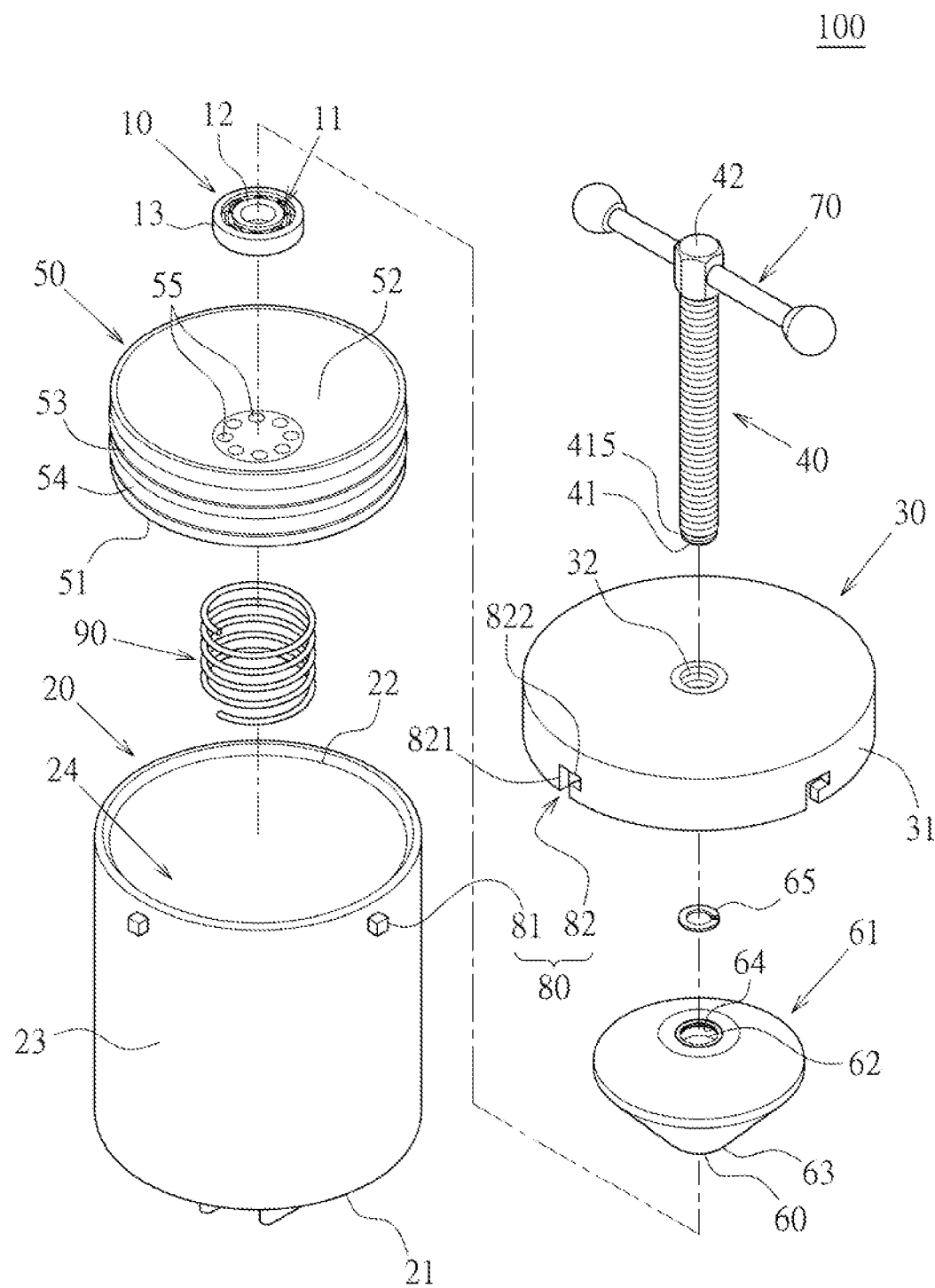
FIG. 1 is an exploded perspective view of a preferred embodiment of the invention.
Figure 3:
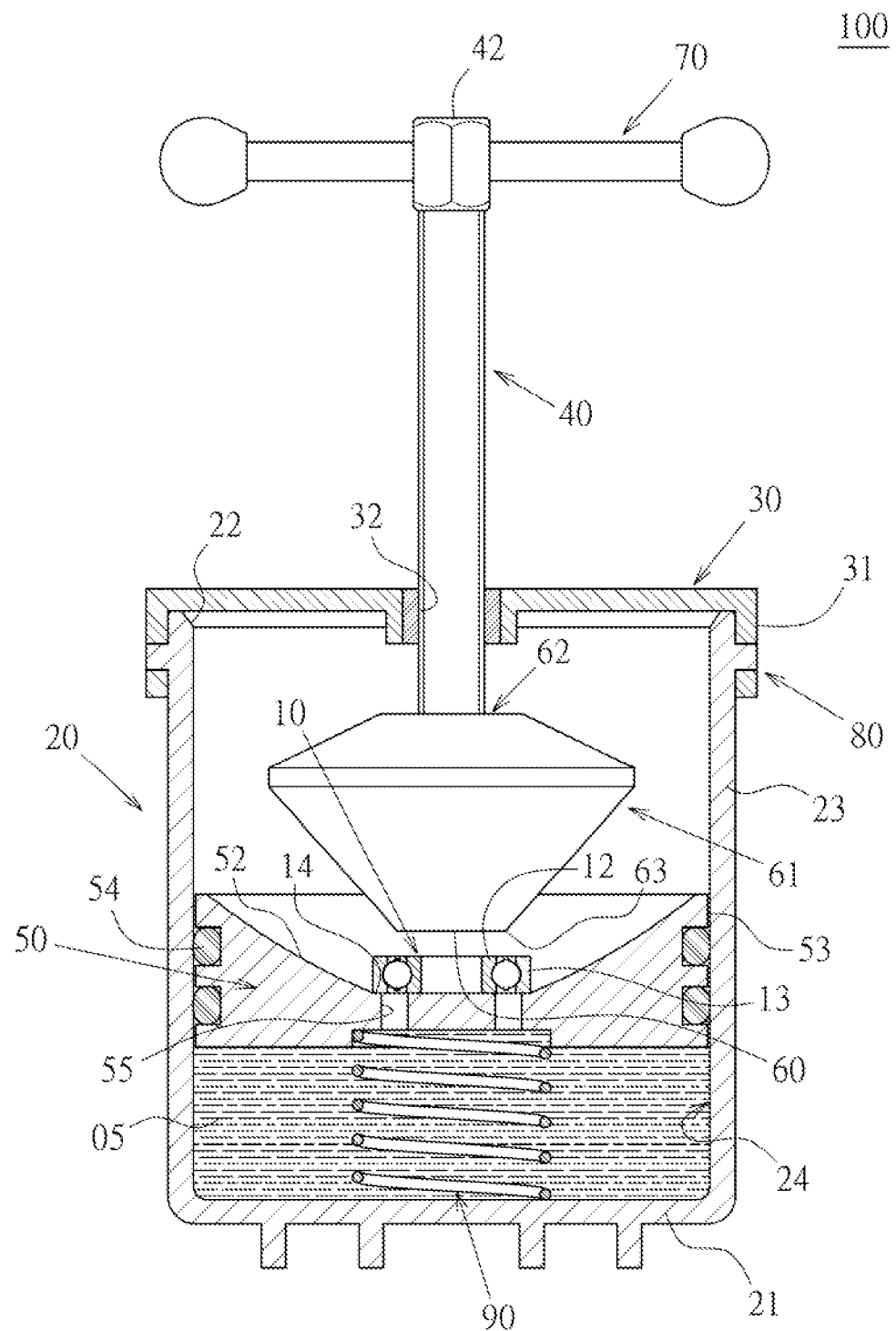
FIG. 3 is a combined sectional view of a preferred embodiment of the invention.

FIG. 1 and FIG. 3 depict a preferred embodiment of the quick-injection grease filling device according to the present invention. However, such an embodiment is for illustrative purpose only, and is not intending to limit the scope of the invention.

The quick-injection grease filling device 100 is specially designed to assist a user to fill grease 05 into the roller unit 11 structure of a bearing 10. The bearing 10 also includes an inner frame part 12 and an outer frame part 13. The quick-injection grease filling device 100 includes an oil cup 20, a detachable guide seat 30, a screw 40, a piston 50, an oppression part 60 and a rotating drive part 70. The oil cup 20 has a closed cup bottom 21, and an open cup mouth 22 and a straight inner peripheral wall 23 between the cup bottom 21 and the cup mouth 22. The inside of the oil cup 20 defines an oil tank 24. The oil tank 24 is used to hold the grease 05. The piston 50 is held inside the oil tank 24 in a form that it can be go upward and downward under a force. The piston 50 has an oppression surface 51 and a bearing placement surface 52 facing opposite directions, and a side ring surface 53 connecting the periphery of the oppression surface 51 and the bearing placement surface 52. The bearing placement surface 52 faces upward toward the cup mouth 22, the oppression surface 51 faces downward toward the cup bottom 21. The oppression surface 51 is used to press down the grease 05 held in the oil tank 24. The bearing placement surface 52 is used for the bearing 10 to be placed on it. The outer frame part 13 of the bearing 10 presses downward upon the bearing placement surface 52, so as to define and form an enclosed and sealed grease filling margin 14. The side ring surface 53 is configured with at least one sealing ring 54. The at least one sealing ring 54 is fitted on the straight inner peripheral wall 23, and is capable of sliding. The center of the piston 50 is formed with a plurality of through-holes 55 that goes through the oppression surface 51 and the bearing placement surface 52. The detachable guide seat 30 includes a combination part 31 and a screw hole 32. The combination part 31 is attached to the mouth 22 of the oil cup 20 through a detachable assembly unit 80, so that the detachable guide seat 30 can be attached to or detached from the cup mouth 22. The screw 40 is screwed into the screw hole 32 of the detachable guide seat 30 to move forward and backward. The screw 40 includes an inner end 41 and an outward extending end 42. The inner end 41 extends into the oil cup 20, the outward extending end 42 extends out of the cup mouth 22 for a preset length, and the rotating drive part 70 is configured on the outward extending end 42. The oppression part 60 is configured on the inner end 41 of the screw 40, so that the oppression part 60 can move forward and backward along with the screw 40. The oppression part 60 is used to press upon the bearing 10 (see FIG. 4).

Figure 4:
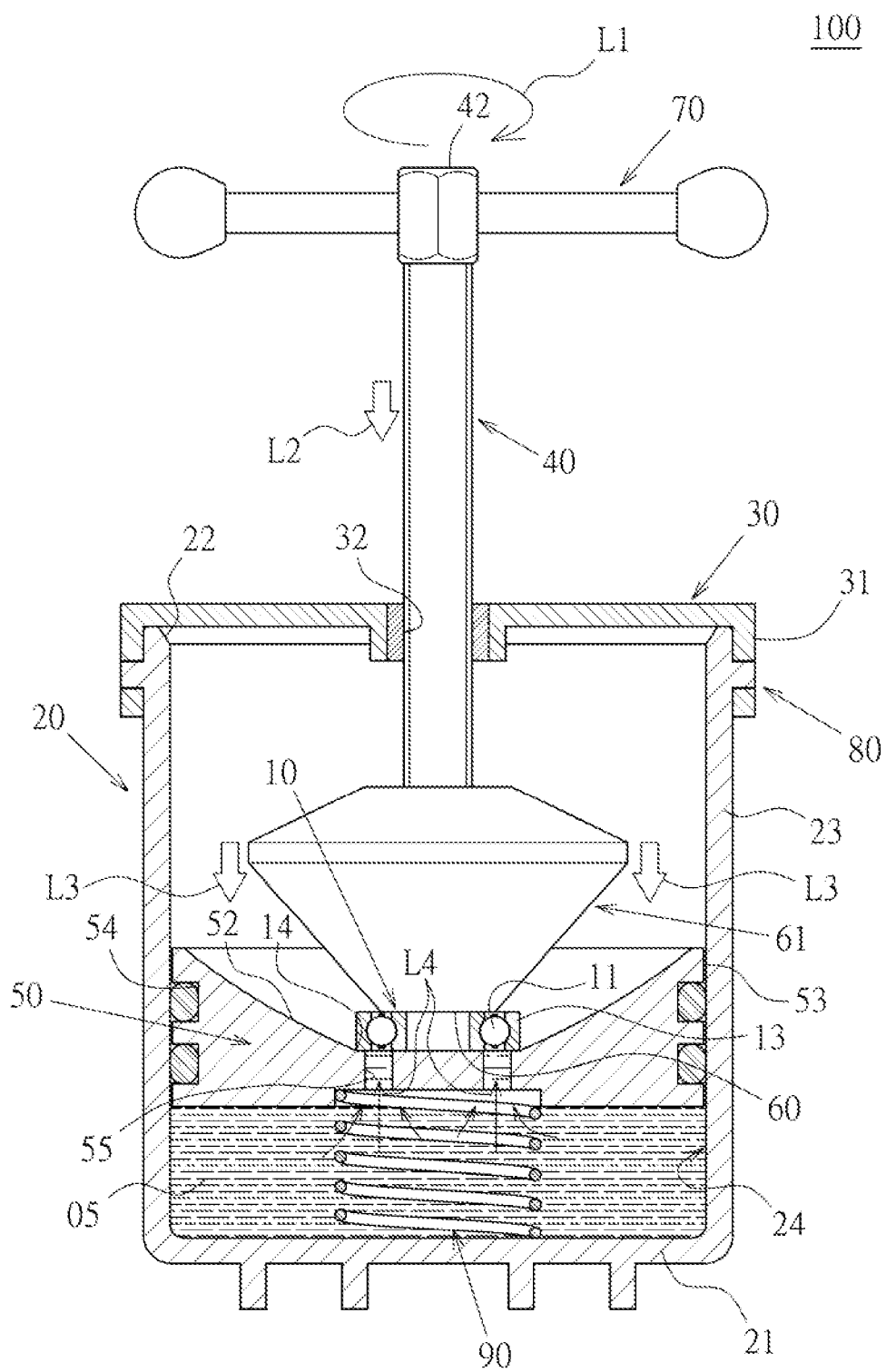
FIG. 4 is a sectional view showing the grease filling operation of a preferred embodiment of the invention.

Based on the structural composition and technical features described above, the quick-injection grease filling device 100 disclosed in the present invention is used like this: firstly, the user pours grease 05 into the oil tank 24 of the oil cup 20, then place the piston 50 into the oil tank 24 to seal the grease 05 from above, and then place the bearing 10 on the bearing placement surface 52 of the piston 50, so that the roller unit 11 of the bearing 10 is aligned to the plurality of through-holes 55 formed in the center of the piston 50; then attach the detachable guide seat 30 to the mouth 22 of the oil cup 20 using the detachable assembly unit 80 of the combination part 31, so that the oppression part 60 on the inner end 41 of the screw 40 is correspondingly placed above the bearing 10 (see FIG. 3). Now, the greasing filling operation can be started. As shown in FIG. 4, the user rotates the rotating drive part 70 (in the direction indicated by Arrow L1), to drive the screw 40 to move downward (as indicated by Arrow L2), and cause the oppression part 60 to press the bearing 10 downward (as indicated by Arrow L3). Now, both the bearing 10 and the piston 50 are pressed to move downward, and under for squeezing force, the grease 05 contained in the oil tank 24 will be squeezed out upward from the plurality of through-holes 55 formed on the piston 50 (as indicated by Arrow L4), and be introduced into the corresponding roller unit 11 of the bearing 10. By now, the whole greasing filling operation is completed.

Figure 5:
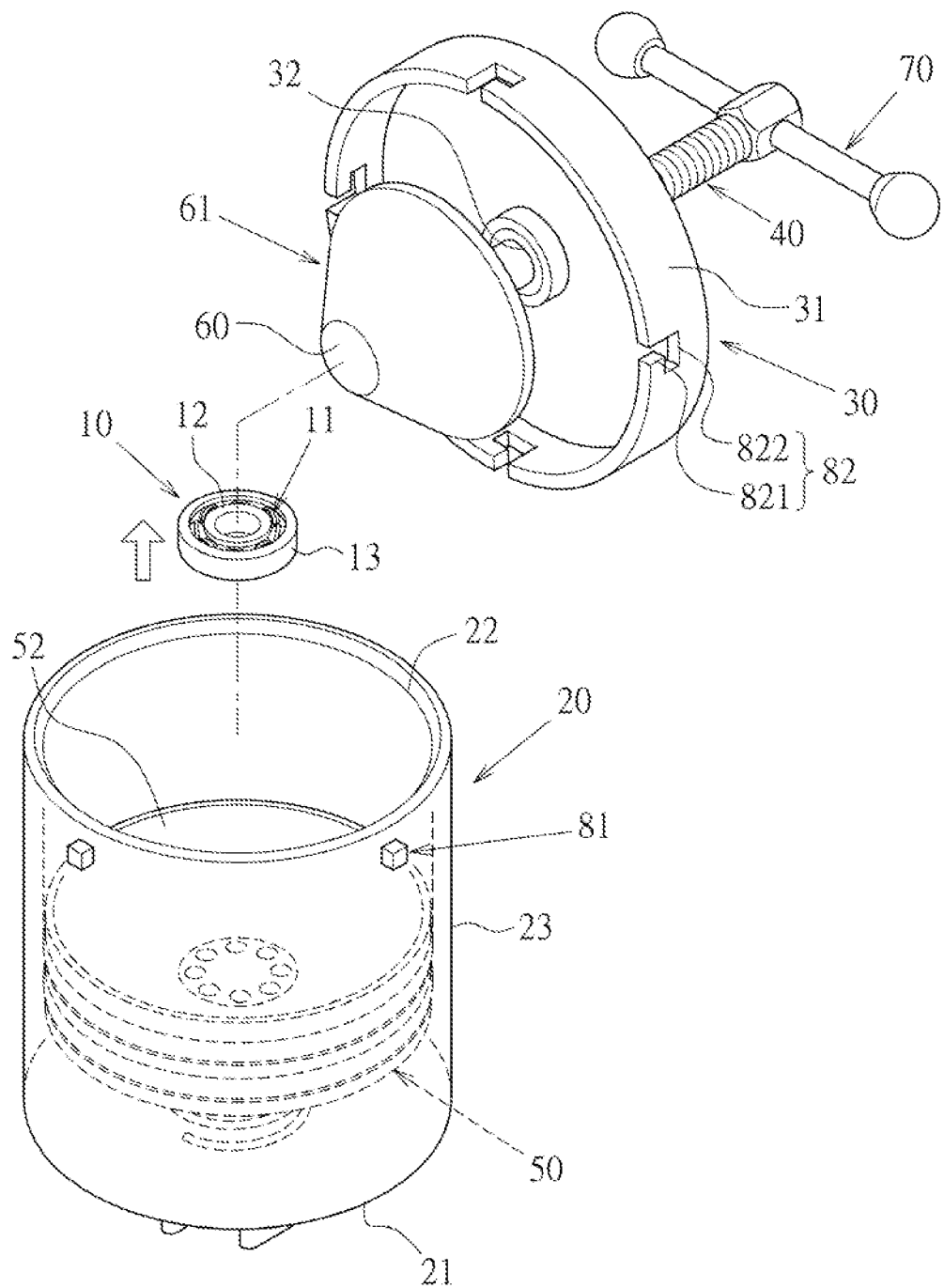
FIG. 5 is a schematic view of a preferred embodiment of the invention showing the bearing can bearing can be quickly taken out after the grease filling operation is completed.

Referring to FIG. 5, after completing the grease filling operation for the bearing 10 as described in the previous paragraph, the user just needs to detach the detachable guide seat 30 from the mouth 22 of the oil cup 20 to take out the bearing 10 filled with grease. The advantageous feature of the present invention is that, when the user wants to proceed to the grease filling operation for the next bearing 10, once the detachable guide seat 30 is attached back to the mouth 22 of the oil cup 20, the grease filling operation can be started by turning the screw 40 (in this way, the grease filling operations can be conducted faster). Therefore, the present invention can perfectly overcome the aforementioned problem that the pressing block has to be rotated for multiple rounds to take out the bearing, which takes more labor and time.

Figure 6:
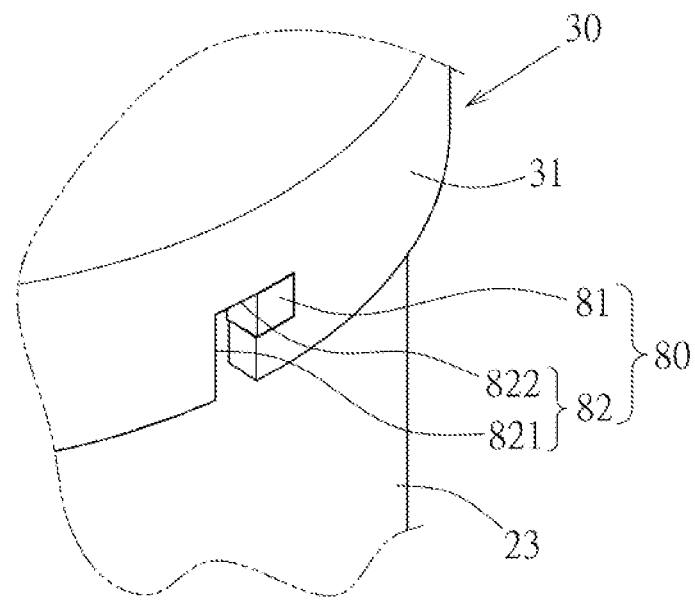
FIG. 6 is a perspective view of a preferred embodiment of the invention showing the clamped state of the detachable assembly unit.
Figure 7:
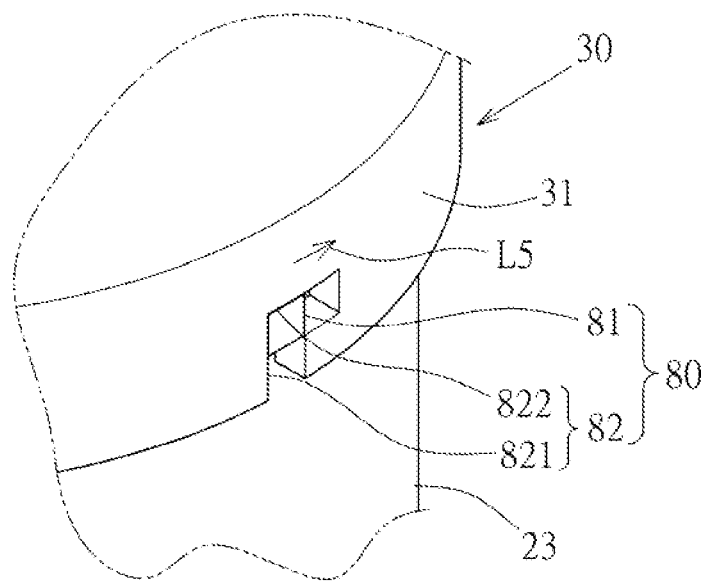
FIG. 7 is a perspective view of a preferred embodiment of the invention showing the released state of the detachable assembly unit.

Referring to FIG. 1 and FIG. 3, in the embodiment, the combination part 31 is in the form of a ring frame bending downward and is formed on the periphery of the detachable guide seat 30. The detachable assembly unit 80 includes a plurality of convex blocks 81 formed at the position near the cup mouth 22 on the straight inner peripheral wall 23 in a circular arrangement with a spacing between each other, and a plurality of L-shaped slots 82 formed on the combination part 31 in a circular arrangement with a spacing between each other. Each L-shaped slot 82 includes a vertical introduction section 821 and a transverse clamping section 822. Through the design of the detachable assembly unit 80 disclosed in this embodiment, the detachable guide seat 30 can be attached and detached quickly by a minimal angle of rotation, so that the work efficiency can be enhanced. By comparing the difference between FIG. 6 and FIG. 7, it can be seen that the detachable guide seat 30 can be released to be detached by a rotation of 3 to 5 degrees (as indicated by Arrow L5).

Specifically, the oppression part can be integrally formed on the inner end of the screw (note: omitted in the figure of the embodiment).

Referring to FIG. 1 and FIG. 3, in this embodiment, the oppression part 60 is formed on a pressing block 61, and the pressing block 61 is fitted on the inner end 41 of the screw 40 in a form that enables rotation. Specifically, the pressing block 61 includes an upper end driven part 62 and a lower end part 63. The oppression part 60 is formed on the lower end part 63. The upper end driven part 62 is connected on the inner end 41 of the screw 40. The upper end driven part 62 is designed as a concave trough and a ring slot 64 is formed on the wall of the concave trough for the outer side of a buckle 65 to be embedded in it. Furthermore, the inner end 41 of the screw 40 is correspondingly formed with a positioning ring groove 415 for the inner side of the buckle 65 to be embedded in it. Thus, the screw 40 and the oppression part 60 are connected to each other while being able to rotate.

Referring to FIG. 3, in this embodiment, a further elastic support component 90 is provided between the oppression surface 51 of the piston 50 and the bottom 21 of the oil cup 20. The efficacy of this embodiment is as follows: when the piston 50 is pushed to the lowest position, due to the viscosity of the grease 05 and vacuum absorption, it may become difficult to take it out. In such a situation, the elastic support component 90 can push the piston 50 upward so that it can be released from the adhesion and vacuum absorption described above, and the piston 50 can be taken out easily.

Figure 2:
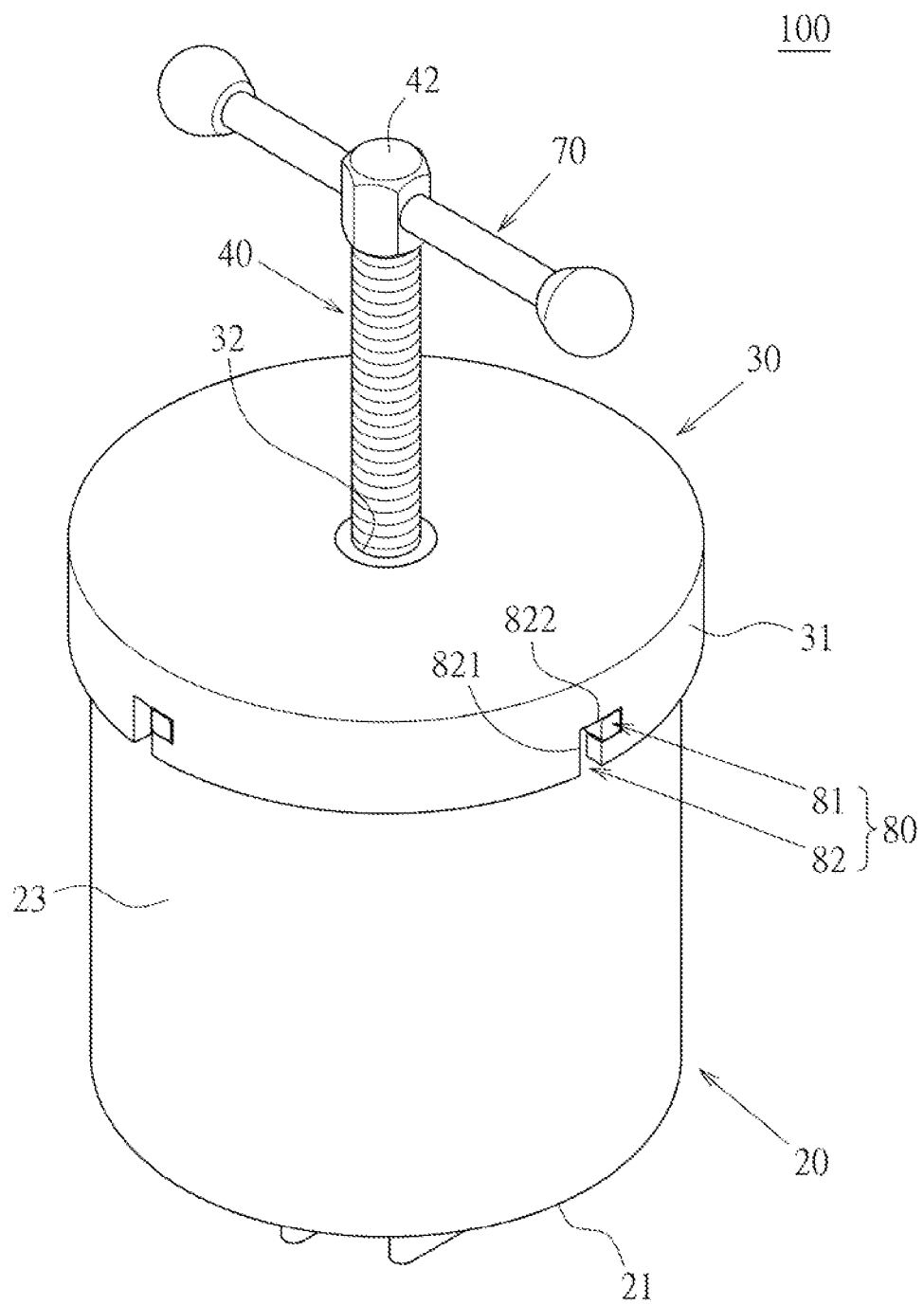
FIG. 2 is a combined perspective view of a preferred embodiment of the invention.

Specifically, the rotating drive part 70 and the outward extending end 42 of the screw 40 are integrally formed or combined together. The rotating drive part 70 disclosed in FIG. 1 to FIG. 3 is combined with the outward extending end 42 of the screw 40 in the form of a lever. In addition, the rotating drive part 70 can also be integrally formed on the outward extending end 42 of the screw 40 in a polygonal design (not shown in the figure). Both embodiments of the rotating drive part 70 can facilitate rotation by the user.

What is claimed is:

1. A quick-injection grease filling device for filling grease into a roller unit structure of a bearing, the bearing having an inner frame part and an outer frame part, the quick-injection grease filling device comprising:

an oil cup having a closed cup bottom and an upper cup mouth, said oil cup having a straight inner peripheral wall extending between the closed cup bottom and the upper cup mouth, said oil cup having an interior that defines an oil-receiving tank, the oil-receiving tank adapted to hold the grease therein;

a piston received in the oil-receiving tank and being driveable upwardly and downwardly in the oil-receiving tank, said piston having an oppression surface and a bearing placement surface facing opposite directions, said piston having a side ring surface connected to a periphery of the oppression surface and the bearing placement surface, wherein the bearing placement surface faces toward the upper cup mouth, the oppression surface facing toward the closed cup bottom, the oppression surface adapted to press on the grease in the oil-receiving tank, the bearing placement surface adapted to allow the bearing to be placed thereon such that the outer frame part of the bearing presses the bearing placement surface to define an enclosed and sealed grease filling margin, wherein the side ring surface has at least one sealing ring, the at least one sealing ring being slidably fitted on the straight inner peripheral wall, wherein a center of said piston has a plurality of through-holes extending through the oppression surface and the bearing placement surface;

a detachable guide seat having a combination part and a screw hole, the combination part being attached to the upper cup mouth of said oil cup through a detachable assembly unit such that said detachable guide seat is attachable to or detachable from the upper cup mouth;

a screw screwed into the screw hole of said detachable guide seat so as to be movable forwardly and backwardly, said screw having an inner end and an outwardly extending end, the inner end extending into said oil cup, the outwardly extending end extending out of the upper cup mouth, the outwardly extending end having a rotating drive part thereon; and an oppression part configured on an inner end of said screw such that said oppression part is movable forwardly and backwardly along with said screw, said oppression part adapted to press upon the bearing.

2. The quick-injection grease filling device of claim 1, wherein the combination part has a ring frame shape that bends downwardly and is formed on a periphery of said detachable guide seat, wherein the detachable assembly unit has a plurality of convex blocks formed adjacent the upper cup mouth on the straight inner peripheral wall in a circular arrangement, the combination part having a plurality of L-shaped slots formed in a spaced circular arrangement on the combination part, each L-shaped slot of the plurality of L-shaped slots having a vertical introduction section and a transverse clamping section.

3. The quick-injection grease filling device of claim 1, wherein the oppression part is integrally formed on the inner end of said screw.

4. The quick-injection grease filling device of claim 1, wherein the oppression part is formed on a pressing block.

5. The quick-injection grease filling device of claim 4, wherein the pressing block is rotatably connected to the inner end of the said screw, the pressing block having an upper end driven part and a lower end part, the oppression part being formed on the lower end part, the upper end driven part being connected on the inner end of said screw, the upper end driven part having a concave trough shape and having a ring slot formed on a wall of the concave trough shape, the ring slot adapted to receive an outer side of the buckle therein, the inner end of said screw having a positioning ring groove that is adapted to receive an inner side of the buckle such that said screw and said oppression part are rotatable and connected together.

6. The quick-injection grease filling device of claim 1, further comprising: an elastic support component formed between the oppression surface of said piston and the closed cup bottom of said oil cup.

7. The quick-injection grease filling device of claim 1, wherein the rotating drive part and the outwardly extending end of said screw are integrally formed together.

* * * * *